United States Patent
Eliassi

(10) Patent No.: US 12,474,556 B2
(45) Date of Patent: Nov. 18, 2025

(54) LIGHTWEIGHT MODIFIED-SCHMIDT CORRECTOR LENS

(71) Applicant: RAYTHEON COMPANY, Waltham, MA (US)

(72) Inventor: Ravash Joshua Eliassi, Los Angeles, CA (US)

(73) Assignee: Raytheon Company, Arlington, VA (US)

( * ) Notice: Subject to any disclaimer, the term of this patent is extended or adjusted under 35 U.S.C. 154(b) by 1121 days.

(21) Appl. No.: 16/793,578

(22) Filed: Feb. 18, 2020

(65) Prior Publication Data

US 2021/0255444 A1     Aug. 19, 2021

(51) Int. Cl.
    *G02B 17/08*    (2006.01)
    *G02B 1/11*     (2015.01)
    *H04N 23/20*    (2023.01)

(52) U.S. Cl.
    CPC ............ *G02B 17/0888* (2013.01); *G02B 1/11* (2013.01); *H04N 23/20* (2023.01)

(58) Field of Classification Search
    CPC ...... G02B 17/08; G02B 17/0888; G02B 1/11; H04N 5/33
    See application file for complete search history.

(56) References Cited

U.S. PATENT DOCUMENTS

| | | |
|---|---|---|
| 2,547,416 A | 4/1951 | Skellett |
| 3,430,248 A | 2/1969 | Lightbrown |
| 4,507,551 A | 3/1985 | Howard et al. |
| 4,695,139 A | 9/1987 | Bagby et al. |
| 6,919,988 B2 | 7/2005 | Cook |
| 7,579,979 B1 * | 8/2009 | Park .......................... G01J 3/36 342/53 |
| 7,933,067 B1 | 4/2011 | Cook |
| 9,110,276 B2 | 8/2015 | Cook |
| 9,307,222 B1 * | 4/2016 | Tang ..................... H04N 23/676 |
| 9,535,258 B1 | 1/2017 | Whiteaker |
| 9,565,372 B2 * | 2/2017 | Cook .................. G02B 17/0852 |
| 9,766,462 B1 * | 9/2017 | Worley .............. G02B 27/0172 |
| 2002/0027712 A1 * | 3/2002 | Soskind ............. G02B 27/4216 359/565 |
| 2003/0206338 A1 * | 11/2003 | Cook .................. G02B 17/0852 359/356 |
| 2003/0218801 A1 | 11/2003 | Korniski et al. |
| 2006/0071876 A1 | 4/2006 | Clymer et al. |

(Continued)

FOREIGN PATENT DOCUMENTS

| | | |
|---|---|---|
| EP | 2738876 A1 | 6/2014 |
| FR | 1253878 A | 2/1961 |

(Continued)

OTHER PUBLICATIONS

International Search Report and Written Opinion in International Patent Application No. PCT/US2020/058878 dated Feb. 2, 2021.

(Continued)

*Primary Examiner* — Joseph G Ustaris

(57) ABSTRACT

A modified-Schmidt corrector lens including a first side having a curved surface configured to direct electromagnetic radiation, and a second side having a stepped surface including one or more stepped zones positioned to maintain a substantially constant thickness along a radius of the corrector lens.

22 Claims, 9 Drawing Sheets

(56) References Cited

U.S. PATENT DOCUMENTS

| | | | |
|---|---|---|---|
| 2008/0023632 A1 | 1/2008 | Ridgway et al. | |
| 2011/0025432 A1 | 2/2011 | Gagnon et al. | |
| 2011/0089286 A1 | 4/2011 | McCarthy | |
| 2011/0268868 A1 | 11/2011 | Dowski, Jr. et al. | |
| 2012/0026382 A1 | 2/2012 | Moskun et al. | |
| 2013/0088714 A1 | 4/2013 | Terada et al. | |
| 2013/0257646 A1 | 10/2013 | Gopalsami et al. | |
| 2015/0181487 A1* | 6/2015 | Konrad | H04L 67/104 370/329 |
| 2016/0041390 A1* | 2/2016 | Poon | G02B 5/3083 359/489.08 |
| 2016/0057364 A1 | 2/2016 | Cook | |
| 2016/0097930 A1* | 4/2016 | Robbins | G02B 27/0172 359/619 |
| 2019/0353888 A1 | 11/2019 | Pentico et al. | |
| 2019/0377161 A1* | 12/2019 | Lin | G02B 9/64 |
| 2020/0069177 A1* | 3/2020 | Kim | A61B 3/1015 |
| 2021/0359236 A1* | 11/2021 | Wei | H10K 77/111 |

FOREIGN PATENT DOCUMENTS

| | | |
|---|---|---|
| GB | 602872 A | 6/1948 |
| WO | 9218893 A1 | 10/1992 |

OTHER PUBLICATIONS

Anonymous: "Fresnel Lens", Wikipedia, Nov. 9, 2019, XP055768073, Retrieved from the Internet: URL:https://en.wikipedia.org/w/index.php?title=Fresnel_lens&oldid=925357390 [retrieved on Jan. 22, 2021].

Anonymous: "Zone Plate", Wikipedia, Nov. 21, 2019, XP055768079, Retrieved from the Internet:URL:https://en.wikipedia.org/w/index.php?title=Zone plate&oldid=927313219 [retrieved on Jan. 22, 2021].

International Search Report and Written Opinion in International Patent Application No. PCT/US2020/065657 dated Mar. 12, 2021.

Lloyd Jones, "Reflective and Catadioptric Objectives", in Handbook of Optics, Second Edition, vol. 2, Chapter 18, McGraw-Hill (1995), pp. 1-45.

Linfoot et al., "On the Aberrations of the Field-Flattened Schmidt Camera", Monthly Notices of the Royal Astronomical Society, vol. No. 109, Jan. 1, 1949, pp. 535-556.

International Search Report and Written Opinion mailed Sep. 16, 2015 in WO Application No. PCT/US2015/037855, 41 Pages.

* cited by examiner (Front)

(Back)

LIGHTWEIGHT MODIFIED-SCHMIDT CORRECTOR LENS

BACKGROUND

Optical-based imaging systems may be included in various communication systems and can provide fast optical speed, low aberrations, low distortion, low obscuration, and small physical size. However, some communication systems are weight sensitive and the lenses included in such optical-based imaging systems can increase the weight of the system significantly and limit performance.

SUMMARY OF INVENTION

One aspect of the present disclosure is directed to a modified-Schmidt corrector lens including a first side having a curved surface configured to direct electromagnetic radiation, and a second side having a stepped surface including one or more stepped zones positioned to maintain a substantially constant thickness along a radius of the corrector lens.

In one embodiment, a depth of each stepped zone corresponds to a wavelength of the electromagnetic radiation. In some embodiments, an amount of gain provided by the corrector lens corresponds to a diameter of the corrector lens. In certain embodiments, the second side includes an anti-reflective layer to minimize electromagnetic radiation reflections. In one embodiment, the anti-reflective layer includes a plurality of anti-reflective holes drilled into the second side. In some embodiments, each of the plurality of anti-reflective holes is configured with dimensions and spacing corresponding to a frequency of the electromagnetic radiation.

In certain embodiments, the corrector lens is fabricated using a 3-axis Computer Numerical Control (CNC) machine. In various embodiments, the corrector lens is fabricated from a plastic material.

Another aspect of the present disclosure is directed to an optical imaging system including an imaging detector located at a focal plane of the optical imaging system, the imaging detector being responsive to electromagnetic radiation, a field lens coupled to the imaging detector and configured to focus the electromagnetic radiation onto the imaging detector, and a modified-Schmidt corrector lens including a first side having a curved surface configured to direct the electromagnetic radiation and a second side having a stepped surface including one or more stepped zones positioned to maintain a substantially constant thickness along a radius of the corrector lens.

In one embodiment, a depth of each stepped zone corresponds to a central operating wavelength of the system. In some embodiments, an amount of gain provided by the modified-Schmidt corrector lens corresponds to a diameter of the corrector lens. In certain embodiments, the second side of the modified-Schmidt corrector lens includes an anti-reflective layer to minimize electromagnetic radiation reflections. In one embodiment, the anti-reflective layer includes a plurality of anti-reflective holes drilled into the second side of the modified-Schmidt corrector lens. In some embodiments, each of the plurality of anti-reflective holes is configured with dimensions and spacing corresponding to a central operating wavelength of the system.

In certain embodiments, the imaging detector is a focal plane array sensor. In various embodiments, the imaging detector is responsive to electromagnetic radiation in a wavelength range of approximately 5-50 millimeters. In one embodiment, the optical imaging system includes a primary reflector configured to reflect the electromagnetic radiation directed by the modified-Schmidt corrector lens towards the field lens. In some embodiments, the primary reflector is spherical reflector. In certain embodiments, the imaging detector is interposed between the field lens and the modified-Schmidt corrector lens.

In one embodiment, the imaging detector includes a two-dimensional array of pixels, with each pixel having a width approximately equal to one half of a central operating wavelength of the system. In some embodiments, the optical imaging system includes a transceiver coupled to the imaging detector, and the imaging detector includes a two-dimensional array of pixels, a first pixel of the array being associated with a first communication channel of the transceiver, and a second pixel of the array being associated with a second communication channel of the transceiver.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments described herein provide optical lenses for use in imaging systems that leverage advances in focal plane array (FPA) sensor technology. By extending imaging techniques used in the visible and/or infrared spectral bands, and leveraging the capability of newer FPA sensors, aspects and embodiments described herein may provide lightweight optical imaging systems having a compact optical form and fast optical speed for use in various communication systems (e.g., space communication).

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

One approach for providing optical imaging systems having a compact optical form and fast optical speed has been to use a Schmidt corrector lens in a short flat-field Schmidt imager. One such implementation is described in U.S. Pat. No. 9,565,372 to Cook titled "COMPACT SHORT FLAT-FIELD SCHMIDT OPTICS FOR MM-WAVE OPERATION," which is hereby incorporated herein by reference in its entirety for all purposes.

Figure 1A:
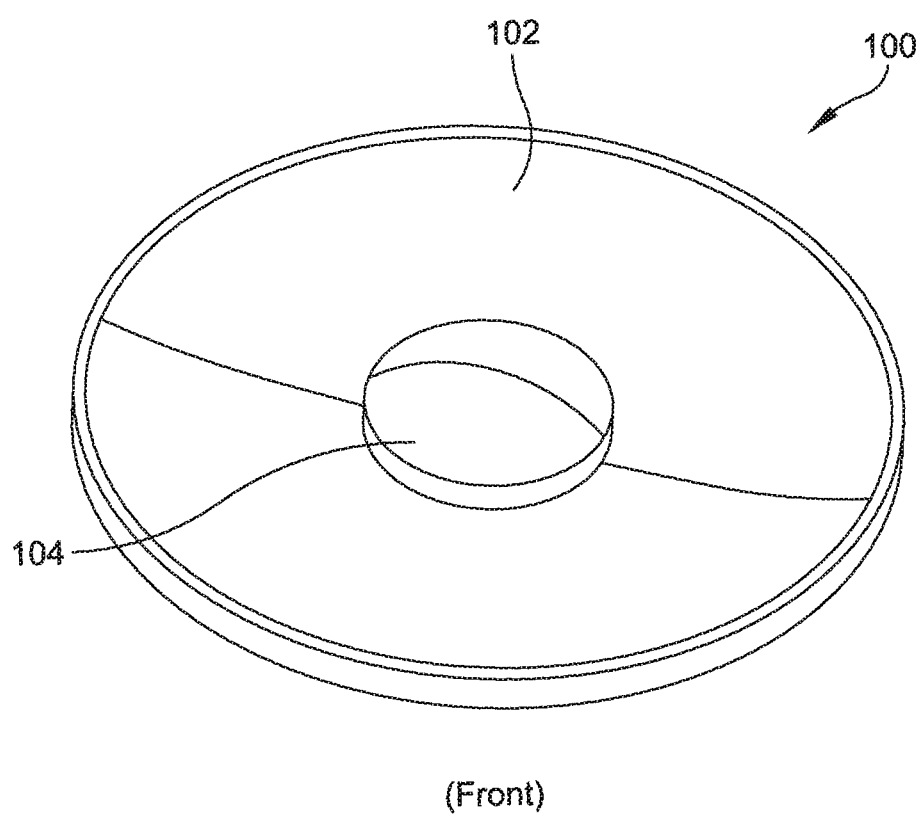
FIG. 1A is a front perspective view of one example of a Schmidt corrector lens arrangement.

FIG. 1A illustrates a front-side view of an example Schmidt corrector arrangement generally indicated at 100. As shown, the Schmidt corrector arrangement 100 includes a Schmidt corrector lens 102 and a field (or immersion) lens 104 centrally positioned on the Schmidt corrector lens 102. The frontside of the Schmidt corrector lens 102 includes a surface curvature. In one example, the surface curvature may increase moving away from a center of the corrector lens. For example, the center of the Schmidt corrector lens 102 may be substantially flat, and the surface curvature may begin to increase moving away from the center along the radius of the corrector lens.

Figure 1B:
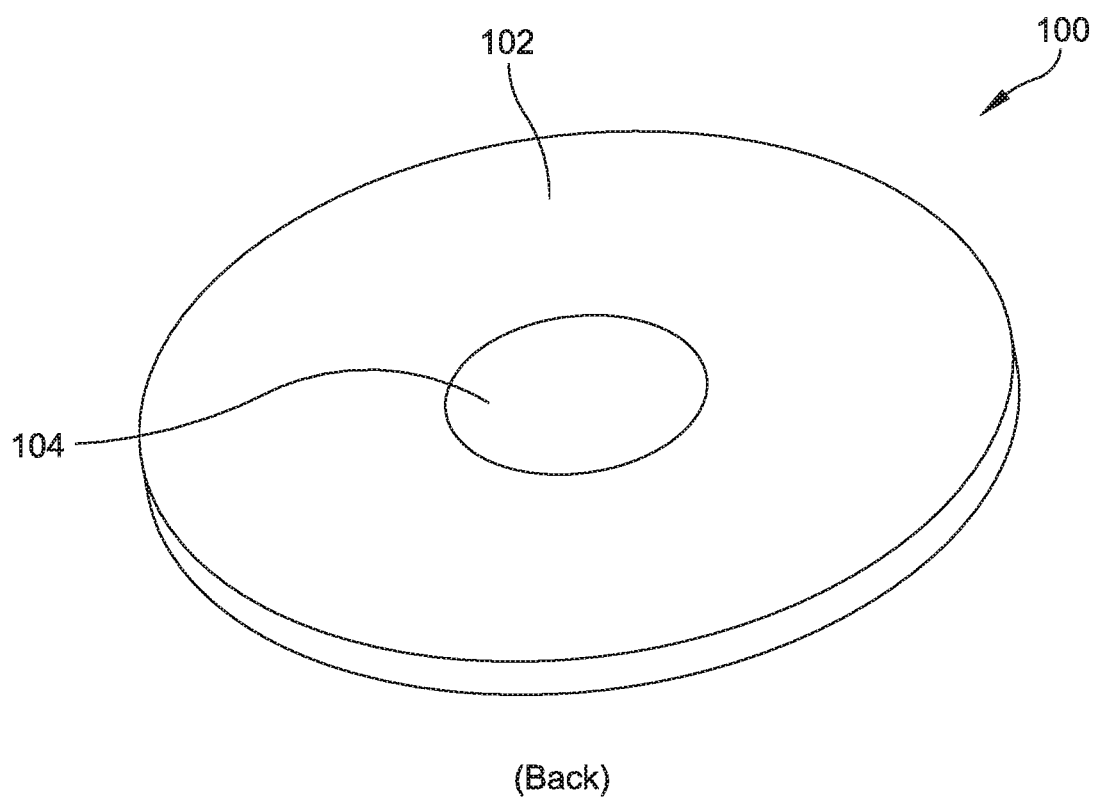
FIG. 1B is a back perspective view of the Schmidt corrector lens arrangement shown in FIG. 1A.

FIG. 1B illustrates a back-side view of the Schmidt corrector arrangement 100 shown in FIG. 1A. As shown, the backside of the Schmidt corrector lens 102 may be substantially flat (i.e., no surface curvature). As such, being that the frontside surface curvature increases moving away from the center of the Schmidt corrector lens 102, the thickness of the corrector lens may also increase moving away from the center of the corrector lens. For example, the center of the Schmidt corrector lens 102 may be the thinnest portion of the corrector lens and the outer edge may be the thickest portion of the corrector lens. While the Schmidt corrector lens 102 can provide the ability to achieve high-performance imaging, many optical imaging applications are weight-sensitive, and the thickness of the Schmidt corrector lens 102 can be excessively heavy, even when made from certain plastic materials (e.g., Rexolite®). As a result, the diameter of the Schmidt corrector lens 102 is often reduced to reduce weight, thereby limiting the performance of the optical imaging system.

Accordingly, it is desirable to reduce excess weight associated with optical imaging systems while maintaining performance. As such, various aspects and examples described herein provide an improved, lightweight modified-Schmidt corrector lens. In at least one example, the modified-Schmidt corrector lens includes one or more stepped zones on the backside of the corrector lens. In some examples, the use of stepped zones on the backside of the corrector lens may maintain or improve performance while providing significant reductions in weight.

Figure 2A:
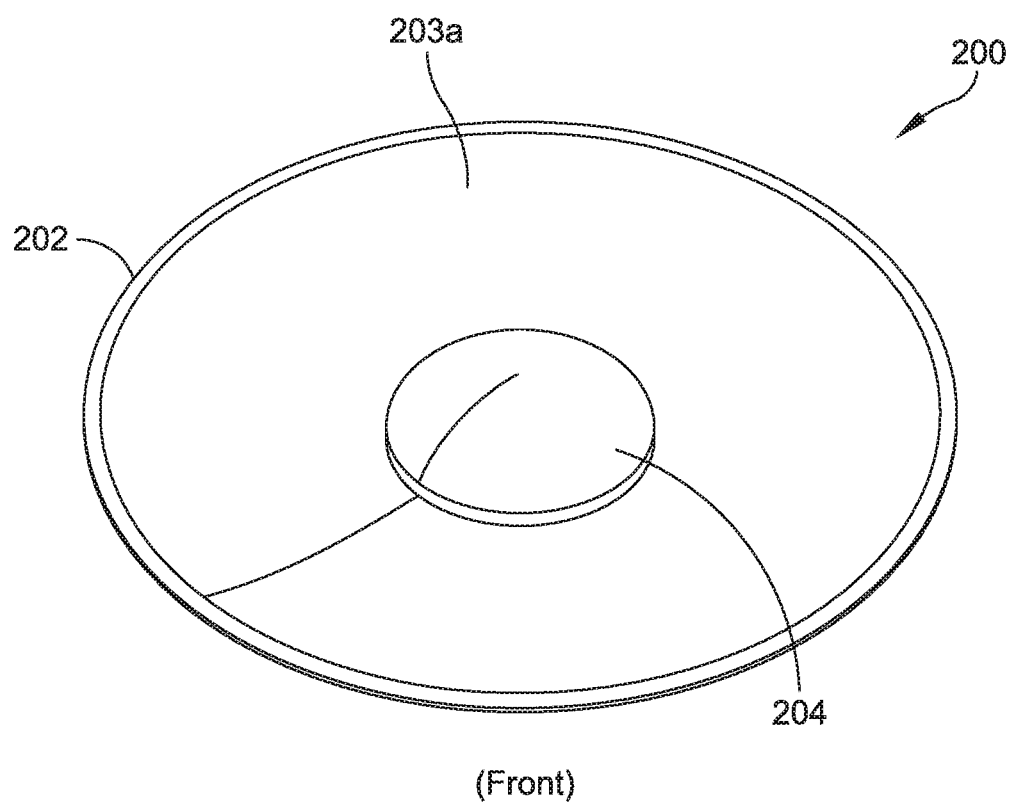
FIG. 2A is a front perspective view of a modified-Schmidt corrector lens arrangement in accordance with aspects described herein.
Figure 2B:
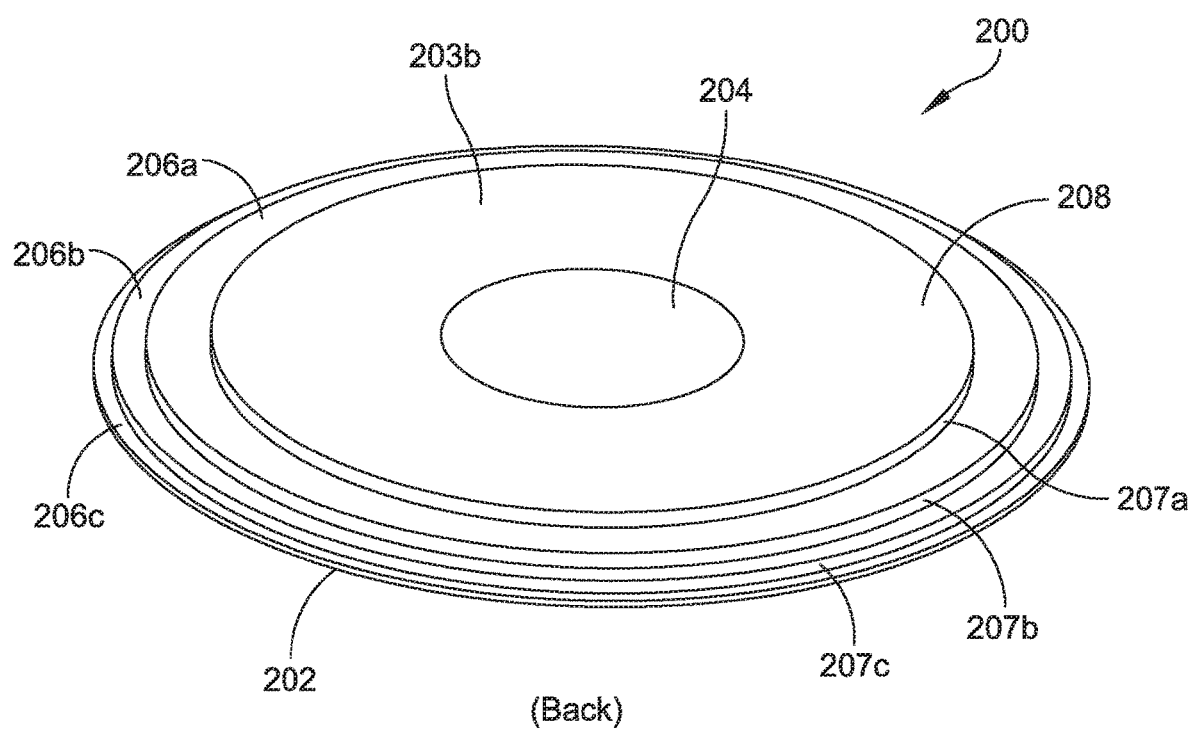
FIG. 2B is a back perspective view of the a modified-Schmidt corrector lens arrangement shown in FIG. 2A.

FIG. 2A illustrates a front-side view of a modified-Schmidt corrector arrangement generally indicated at 200 in accordance with aspects described herein. As shown, the modified-Schmidt corrector arrangement 200 includes a modified-Schmidt corrector lens 202 and a field lens 204 centrally positioned on and directly coupled to the modified-Schmidt corrector lens 202. In one example, the modified-Schmidt corrector lens 202 includes a lens body having a frontside (first) surface 203a and a backside (second) surface 203b (FIG. 2B). The frontside surface 203a of the modified-Schmidt corrector lens 202 includes a surface curvature that increases moving away from a center of the corrector lens. In some examples, the Schmidt corrector arrangement 200 may be configured in an optical imaging system in such a manner that the modified-Schmidt corrector lens 202 directs incident electromagnetic radiation to a primary mirror or reflector (not shown). The electromagnetic radiation may be reflected off the primary mirror towards the field lens 204 to form an image.

FIG. 2B illustrates a backside view of the modified-Schmidt corrector arrangement 200. In one example, the backside surface 203b of the modified-Schmidt corrector lens 202 includes a plurality of stepped zones 206a, 206b, 206c; however, in other examples, the modified-Schmidt corrector lens 202 may include a different number of stepped zones. As shown, the backside surface 203b of the corrector lens 202 includes a plurality of steps 207a, 207b, 207c positioned to separate the plurality of stepped zones 206a, 206b, 206c. As shown, the first step 207a is positioned between a central zone 208 and the first stepped zone 206a, a second step 207b is positioned between the first stepped zone 206a and the second stepped zone 206b, and a third step 207c is positioned between the second stepped zone 206b and the third stepped zone 206c. In some examples, a step interval (i.e., distance between each stepped zone) may correspond to the surface curvature of the frontside surface 203a of the modified-Schmidt corrector lens 202. For example, a step interval(s) may be selected to maintain a substantially constant thickness across the diameter of the corrector lens with respect to the frontside surface curvature.

Figure 3:
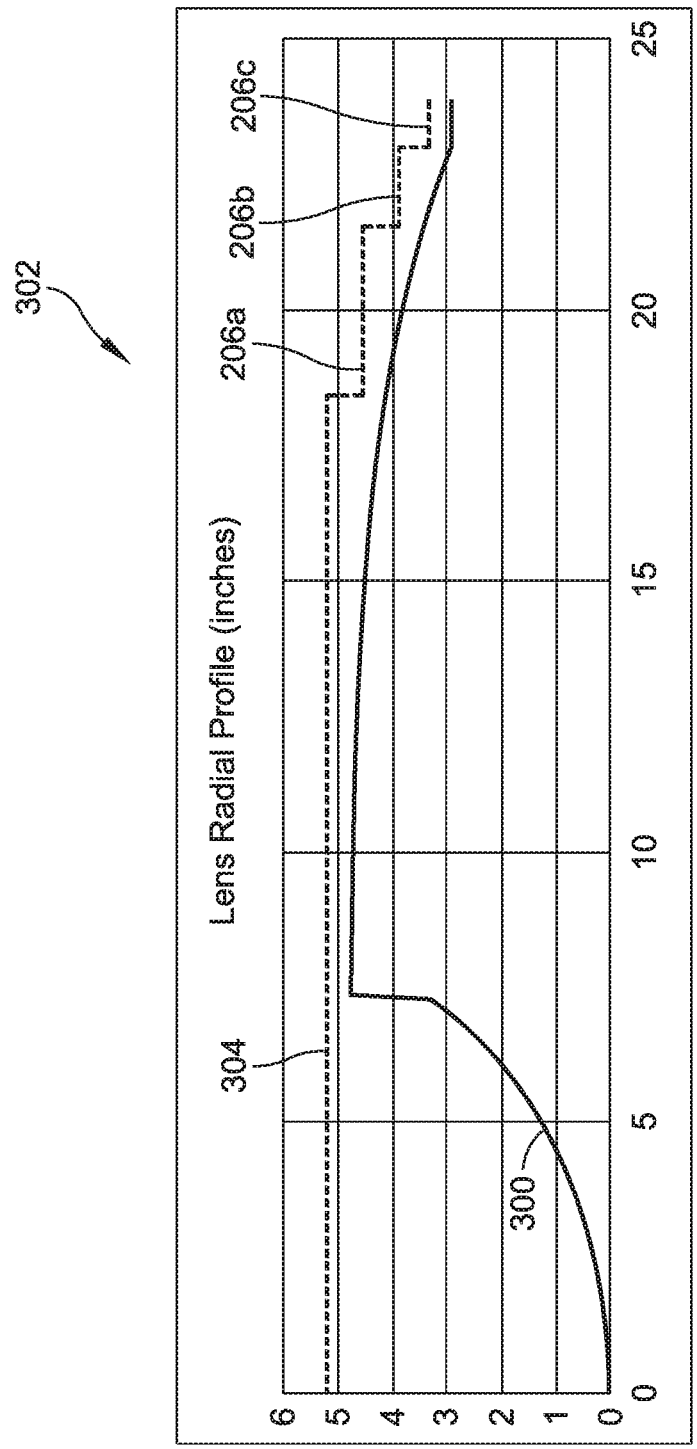
FIG. 3 is a graph illustrating a radial profile of a modified-Schmidt corrector lens in accordance with aspects described herein.

FIG. 3 illustrates a radial profile, generally indicated at 300, of the modified-Schmidt corrector lens 202 in accordance with aspects described herein. In the shown example, the radial profile corresponds to a cross-sectional view of the modified-Schmidt corrector lens 202. The radial profile 300 includes a first trace 302 corresponding to the frontside surface curvature of the corrector lens 202 (and the field lens 204). Likewise, a second trace 304 corresponds to the stepped surface of the backside surface of the corrector lens 202. As described above, the frontside surface curvature of the corrector lens 202 may increase moving away from the center of the corrector lens along the radius. As such, as the frontside surface curvature increases, the stepped zones 206a, 206b, 206c on the backside surface of the corrector lens 202 may be positioned to maintain a sustainably constant thickness along the radius of the corrector lens 202. In some examples, by maintaining a substantially constant thickness, the weight of the modified-Schmidt corrector lens 202 may be reduced up to 45% of the overall weight of the corrector lens.

In one example, the depth of each step may correspond to a target frequency or frequency band (e.g., the frequency of incident electromagnetic radiation). In some examples, the depth of each step may correspond to a multiple of the wavelength of the target frequency (or a center frequency of the target frequency band). For example, the depth of the first stepped zone 206a may be one wavelength, the depth of the second stepped zone 206b may be two wavelengths, and so on. As such, the depth of each step may be selected to tune the modified-Schmidt corrector lens 202 to specific target frequencies or bands. In some examples, the modified-Schmidt corrector lens 202 may be optimized for mm-wave frequencies (e.g., Ka band); however, in other examples the modified-Schmidt corrector lens 202 may be optimized for different frequencies (e.g., SHF band). In addition, the amount of gain provided by the modified-Schmidt corrector lens 202 may correspond to the corrector lens diameter. For example, a larger diameter may correspond to a larger amount of gain than a smaller diameter. In some examples, by utilizing the stepped zones on the backside surface of the corrector lens 202, the diameter of the corrector lens 202 may be increased without substantially increasing weight. As such, the diameter of the corrector lens 202 may be selected to provide a desired amount of gain for specific applications. In some examples, the number of stepped zones on the backside surface of the corrector lens 202 may correspond to the diameter of the corrector lens. For example, a corrector lens diameter of 1.2 meters (m) may correspond to three stepped zones. Likewise, a corrector lens diameter smaller than 1.2 m may include fewer stepped zones and a corrector lens diameter greater than 1.2 m may include more than three stepped zones.

In some examples, a wide variety of different materials may be used to fabricate the modified-Schmidt corrector 202. Some examples of suitable materials for the corrector lens 202 include, but are not limited to, nylon, Rexolite®, various plastics, metamaterials, silicon, glass, Germanium, and Sapphire. In certain applications, the use of a metamaterial composed of a dipole loaded plastic foam may be advantageous in that the plastic foam is very lightweight. A lattice of dipoles, generally metals, may be disposed throughout the plastic foam and customized to provide a specified refractive index while minimizing the density of the material to preserve the lightweight characteristic of the plastic foam.

Figure 4:
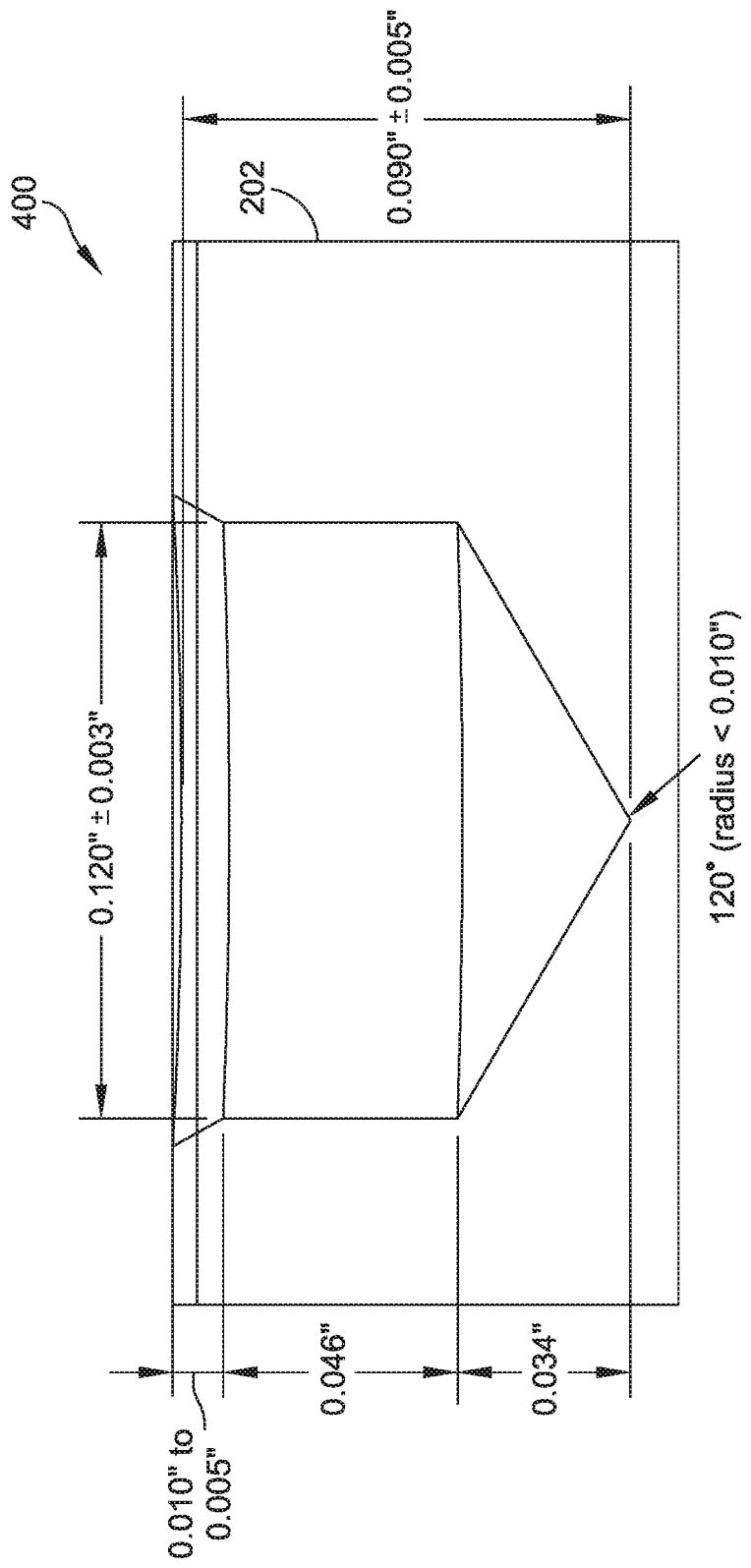
FIG. 4 is a cross-sectional view of an anti-reflective hole of a modified-Schmidt corrector lens in accordance with aspects described herein.

In some examples, the modified-Schmidt corrector lens 202 may include an anti-reflective layer to minimize radio-frequency wave reflections at the dielectric/air interface of the corrector lens. In one example, the anti-reflective layer is produced by drilling a plurality of anti-reflective holes in the backside surface of the corrector lens 202. FIG. 4 illustrates a single anti-reflective hole of the plurality of anti-reflective holes generally indicated at 400 in accordance with aspects described herein. As shown, the anti-reflective hole 400 may be drilled into the backside surface of the corrector lens 202. The anti-reflective holes may have various dimensions and spacing optimized for the frequency of operation (e.g., target frequency or band). In some examples, due to the flat nature of the stepped zones on the backside surface of the corrector lens 202, fabrication cost and complexity can be reduced. For example, the modified-Schmidt corrector lens 202 (including the anti-reflective layer) may be fabricated using a Computer Numerical Control (CNC) machine. Other machining techniques can be used to create the corrector lens 202. In certain examples, due to the reduced fabrication complexity, the modified-Schmidt corrector lens 202 may be fabricated with a 3-axis CNC machine.

Figure 5A:
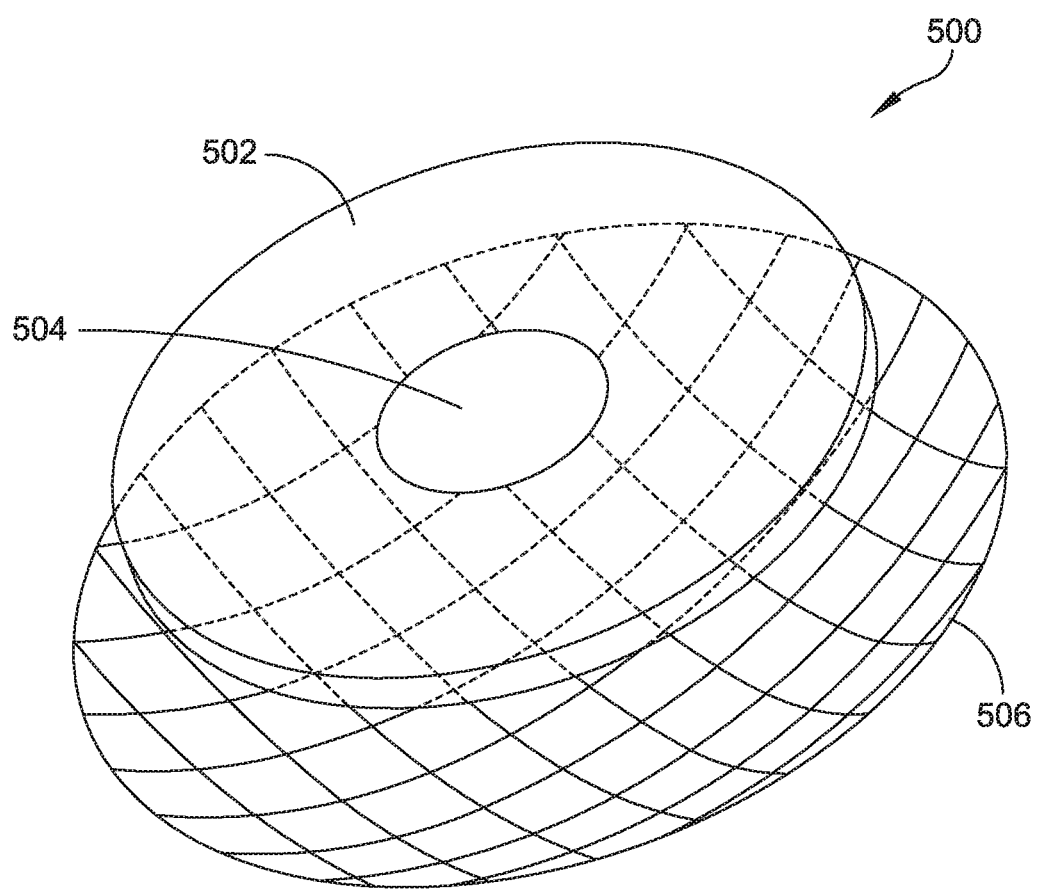
FIG. 5A is a perspective view of an optical imaging system in accordance with aspects described herein.

As described above, the modified-Schmidt corrector arrangement 200 (i.e., the modified-Schmidt corrector lens 202 and the field lens 204) may be configured in an optical imaging system including a primary mirror or reflector. FIG. 5A illustrates an optical imaging system generally indicated at 500 in accordance with aspects described herein. The optical imaging system 500 includes a corrector lens 502, a field lens 504, and a primary reflector 506. Incident electromagnetic radiation is directed by the corrector lens 502 to the primary reflector 506 and is reflected off of the primary reflector 506 towards the field lens 504. The field lens 504 acts as an immersion lens, and the system image plane is located on the rear surface of the field lens 504 (i.e., side facing the corrector lens 502). It is contemplated that other optical components can be included in the optical imaging system 500.

The primary reflector 506 can be any reflecting surface of conventional design and construction capable of reflecting radiation at the desired wavelengths (e.g., mm-wave). For example, a metal coating (such as gold, aluminum, or silver) applied to any kind of substrate may be suitable to create the reflective surface. In some examples, the primary reflector 506 may have a form that is spherical or aspheric. Other optical coatings can be provided to create the reflective surface.

In some examples, the field lens 504 may be configured as a solid optical element having a near hemispherical surface and an opposing flat surface. In certain examples, the field lens 504 may be immediately attached to the corrector lens 502 and centrally positioned with respect to the corrector lens 502. In some examples, an FPA sensor, or another detector, may be attached to one side of the field lens 504. In other examples, the FPA sensor may be arranged differently (e.g., attached to the other side of the corrector lens 502). The use of the field lens 504 may allow a smaller detector (e.g., imaging sensor) to collect the same amount of radiation as would a larger detector in air. For example, the dimensions (i.e., diameter) of the FPA sensor may be smaller than the field lens 504; however, in other examples the dimensions of the FPA sensor may be equal to or larger than the field lens 504. In some examples, the minimum dimensions of the FPA sensor may correspond to the size of the image. In addition, use of the field lens 504 may flatten the field and correct for otherwise present, and potentially severe, comatic and astigmatic aberrations in the system.

Figure 5B:
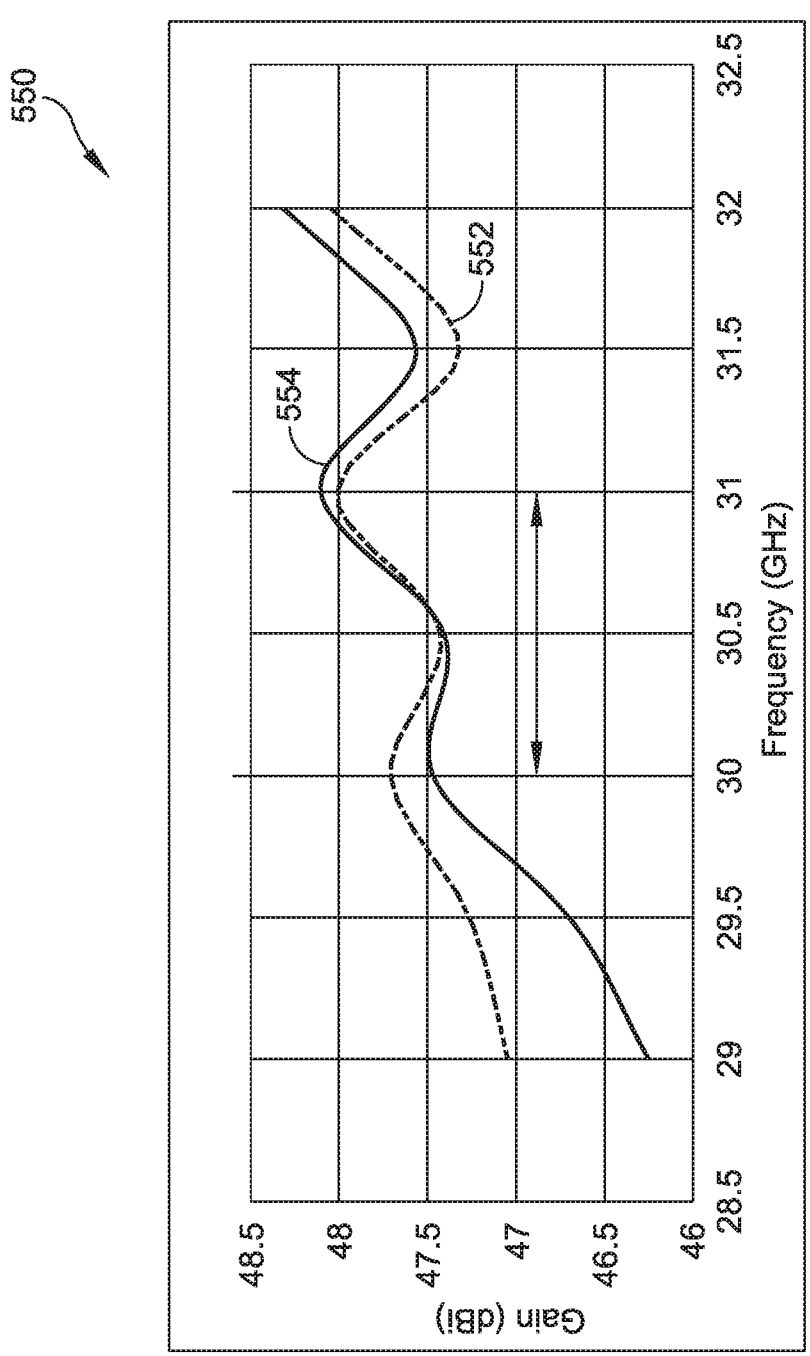
FIG. 5B is a graph illustrating performance results of various optical imaging systems in accordance with aspects described herein.

FIG. 5B illustrates a graph 550 including performance results of the optical imaging system 500. In one example, the graph 550 includes performance results for a first optical imaging system having the corrector lens 502 configured as the Schmidt corrector lens 102 of FIGS. 1A and 1B and a second optical imaging system having the corrector lens 502 configured as the modified-Schmidt corrector lens 202 of FIGS. 2A and 2B. In one example, the corrector lens of the first and second optical systems may be configured with a lens diameter of 1.2 m and be tuned to a desired frequency band (i.e., 30-31 GHz). Likewise, the primary reflector 506 of the first and second optical systems may be a spherical reflector having a diameter of 1.5 m. The graph 550 includes a first curve 552 corresponding to the gain response of the first optical imaging system (i.e., Schmidt corrector lens 102) and a second curve 554 corresponding to the gain response of the second optical system (i.e., modified-Schmidt corrector lens 202). As shown, the second optical imaging system with the modified-Schmidt corrector lens 202 may provide a gain response substantially similar to the gain response of the first optical imaging system having the Schmidt corrector 102 over the desired frequency band. As such, the modified-Schmidt corrector lens 202 may maintain or improve performance while reducing the overall weight of the optical imaging system 500.

Figure 6:
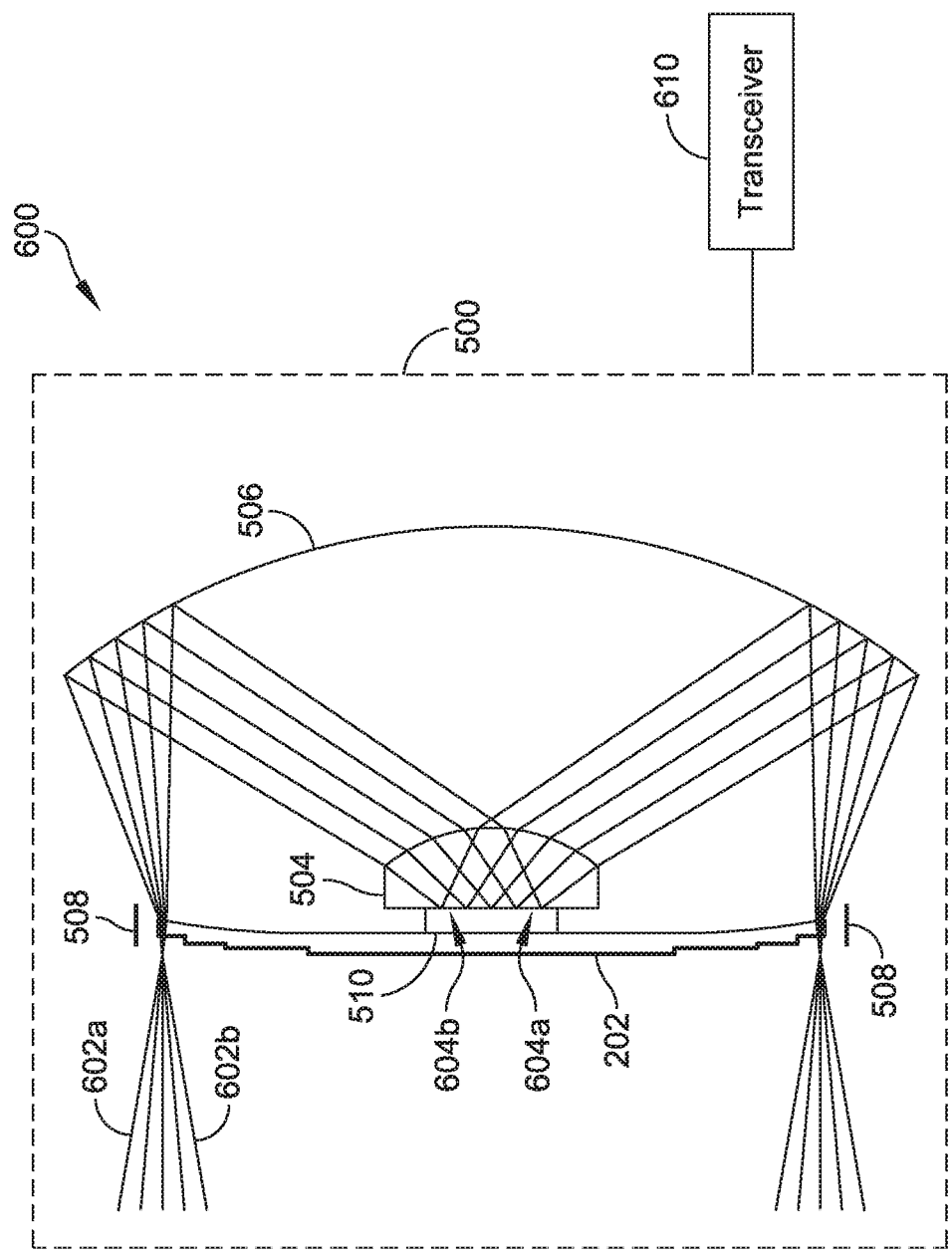
FIG. 6 is a schematic view of a communication system in accordance with aspects described herein.

As described above, the optical imaging systems (e.g., optical imaging system 500) may be included in various communication systems. FIG. 6 illustrates an example communication system generally indicated at 600 in accordance with aspects described herein. In one example, the communication system 600 includes the optical imaging system 500 (configured with the modified-Schmidt corrector lens 202). In one example, each ray of electromagnetic radiation entering via a system aperture stop 508 from a given fixed direction is imaged onto a pixel of an imaging detector array 510. Pixel selection is a function of the angle of incidence of the rays at the system aperture (i.e., on the modified-Schmidt corrector 202), as indicated by well-known first-order imaging equations. In one embodiment, the imaging detector array 510 is a focal plane array (FPA) sensor. In certain embodiments, the imaging detector array 510 may be interposed between the field lens 504 and the modified-Schmidt corrector lens 502. In some examples, the imaging detector array 510 may be responsive to electromagnetic radiation in a wavelength range of approximately 5-50 millimeters (mm). In one embodiment, the imaging detector array 510 includes a two-dimensional array of pixels, with each pixel having a width approximately equal to one half of a central operating wavelength of the system.

Thus, referring to FIG. 6, a ray/signal 602a from a particular object point, for example, will be received at a first angle of incidence, and thus imaged onto a first region of the detector array generally indicated at 604a (corresponding to first pixel). Likewise, a ray/signal 602b from a different object point will be received at a different angle of incidence, and thus imaged onto a second detector region/pixel generally indicated at 604b. As a result, the detector array may be coupled to a transceiver 610, and different pixels of the array may be correlated to different channels of the communication system 600, such that the optical imaging system 500 can be used to simultaneously transmit/receive signals over multiple channels, without requiring multiplexing or other techniques typically associated with multi-channel communication systems.

Accordingly, various aspects and examples described herein provide an improved, lightweight modified-Schmidt corrector lens. In at least one example, the modified-Schmidt corrector lens includes one or more stepped zones on the backside surface of the corrector lens. In some examples, the use of stepped zones on the backside surface of the corrector lens may maintain or improve performance while providing significant reductions in weight.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A modified-Schmidt corrector lens comprising:
   a first side having a curved surface configured to direct electromagnetic radiation; and
   a second side having a stepped surface including a plurality of stepped zones,
   wherein the corrector lens has a substantially constant thickness between the curved surface of the first side and stepped surface of the second side along a radius of the corrector lens.

2. The modified-Schmidt corrector lens of claim 1, wherein a depth of each stepped zone corresponds to a wavelength of the electromagnetic radiation.

3. The modified-Schmidt corrector lens of claim 1, wherein an amount of gain provided by the corrector lens corresponds to a diameter of the corrector lens.

4. The modified-Schmidt corrector lens of claim 1, wherein the second side includes an anti-reflective layer to minimize electromagnetic radiation reflections.

5. The modified-Schmidt corrector lens of claim 4, wherein the anti-reflective layer includes a plurality of anti-reflective holes drilled into the second side.

6. The modified-Schmidt corrector lens of claim 5, wherein each of the plurality of anti-reflective holes is configured with dimensions and spacing corresponding to a frequency of the electromagnetic radiation.

7. The modified-Schmidt corrector lens of claim 1, wherein the corrector lens is fabricated using a 3-axis Computer Numerical Control (CNC) machine.

8. The modified-Schmidt corrector lens of claim 7, wherein the corrector lens is fabricated from a plastic material.

9. The modified-Schmidt corrector lens of claim 1, wherein the stepped surface includes three stepped zones.

10. An optical imaging system comprising:
    an imaging detector located at a focal plane of the optical imaging system, the imaging detector being responsive to electromagnetic radiation;
    a field lens coupled to the imaging detector and configured to focus the electromagnetic radiation onto the imaging detector; and
    a modified-Schmidt corrector lens including a first side having a curved surface configured to direct the electromagnetic radiation and a second side having a stepped surface including a plurality of stepped zones,
    wherein the corrector lens has a substantially constant thickness between the curved surface of the first side and stepped surface of the second side along a radius of the corrector lens.

11. The optical imaging system of claim 10, wherein a depth of each stepped zone corresponds to a central operating wavelength of the system.

12. The optical imaging system of claim 10, wherein an amount of gain provided by the modified-Schmidt corrector lens corresponds to a diameter of the corrector lens.

13. The optical imaging system of claim 10, wherein the second side of the modified-Schmidt corrector lens includes an anti-reflective layer to minimize electromagnetic radiation reflections.

14. The optical imaging system of claim 13, wherein the anti-reflective layer includes a plurality of anti-reflective holes drilled into the second side of the modified-Schmidt corrector lens.

15. The optical imaging system of claim 14, wherein each of the plurality of anti-reflective holes is configured with dimensions and spacing corresponding to a central operating wavelength of the system.

16. The optical imaging system of claim 10, wherein the imaging detector is a focal plane array sensor.

17. The optical imaging system of claim 10, wherein the imaging detector is responsive to electromagnetic radiation in a wavelength range of approximately 5-50 millimeters.

18. The optical imaging system of claim 10, further comprising a primary reflector configured to reflect the electromagnetic radiation directed by the modified-Schmidt corrector lens towards the field lens.

19. The optical imaging system of claim 10, wherein the imaging detector is interposed between the field lens and the modified-Schmidt corrector lens.

20. The optical imaging system of claim 10, wherein the imaging detector includes a two-dimensional array of pixels, and wherein each pixel has a width approximately equal to one half of a central operating wavelength of the system.

21. The optical imaging system of claim 10, further comprising a transceiver coupled to the imaging detector; and wherein the imaging detector includes a two-dimensional array of pixels, a first pixel of the array being associated with a first communication channel of the transceiver, and a second pixel of the array being associated with a second communication channel of the transceiver.

22. The optical imaging system of claim 10, wherein the stepped surface includes three stepped zones.

\* \* \* \* \*